United States Patent [19]
Kobayashi et al.

[11] Patent Number: 5,895,722
[45] Date of Patent: Apr. 20, 1999

[54] WATER-REPELLENT ULTRAVIOLET CUTOFF GLASS AND HEAT-CUTOFF GLASS

[75] Inventors: Hiroaki Kobayashi; Satoshi Shiiki, both of Kanagawa; Jun Kawaguchi, Tokyo; Toyoyuki Teranishi, Kanagawa, all of Japan

[73] Assignee: Nippon Sheet Glass Co., Ltd., Osaka, Japan

[21] Appl. No.: 08/967,373

[22] Filed: Nov. 7, 1997

Related U.S. Application Data

[63] Continuation of application No. 08/555,084, Nov. 8, 1995, abandoned.

[30] Foreign Application Priority Data

Nov. 8, 1994 [JP] Japan ............................ 6-273969

[51] Int. Cl.$^6$ ...................... B32B 17/06; C03C 17/34
[52] U.S. Cl. ...................... 428/429; 428/428; 428/448
[58] Field of Search ........................ 428/428, 429, 428/448

[56] References Cited

U.S. PATENT DOCUMENTS

| 4,983,459 | 1/1991 | Franz et al. | 428/410 |
| 5,106,671 | 4/1992 | Amberger et al. | 428/215 |
| 5,308,705 | 5/1994 | Franz et al. | 428/421 |
| 5,523,161 | 6/1996 | Goodwin | 428/421 |

FOREIGN PATENT DOCUMENTS

WO 80/01051  5/1980  WIPO.

OTHER PUBLICATIONS

Patent Abstract of Japan, vo . . 16, No. 344, Jul. 24, 1992, JP 4-104453 dated Jun. 4, 1992.

*Primary Examiner*—D. S. Nakarani
*Attorney, Agent, or Firm*—Merchant, Gould, Smith, Edell, Welter & Schmidt, P.A.

[57] ABSTRACT

A sheet of ultraviolet-cutoff glass includes a primer layer, an ultraviolet-cutoff layer, and a water-repellent layer which are successively deposited on a glass sheet. The water-repellent layer is formed of a vitreous water repellent. Since the water-repellent layer doubles as an overcoat layer, it makes it unnecessary to form a overcoat layer in a separate overcoating process.

3 Claims, 1 Drawing Sheet

EXTERIOR

INTERIOR

EXTERIOR

INTERIOR

WATER-REPELLENT ULTRAVIOLET CUTOFF GLASS AND HEAT-CUTOFF GLASS

"This is a Continuation of application Ser. No. 08/555,084, filed on Nov. 8, 1995, now abandoned."

BACKGROUND OF THE INVENTION

1. Field of the Invention

The present invention relates to a sheet of ultraviolet-cutoff glass capable of cutting off or blocking ultraviolet rays applied thereto and also of repelling water applied thereto, and a sheet of heat-cutoff glass capable of cutting off or blocking heat radiations applied thereto and also of repelling water applied thereto.

2. Description of the Related Art

Some window glass sheets for use on automobiles comprise sheets of ultraviolet-cutoff glass capable of cutting off or blocking ultraviolet rays applied thereto in order to protect automobile drives and passengers from being sunburned and also protect seats and other interior parts from being deteriorated by ultraviolet radiations. Conventional sheets of ultraviolet-cutoff glass are roughly classified into those which have a composition of materials selected to cut off or block ultraviolet rays, and those which have a surface layer capable of cutting off or blocking ultraviolet rays.

The sheets of ultraviolet-cutoff glass of the latter category include a sheet of glass having a multilayer film capable of reflecting or absorbing radiations in an ultraviolet range, and coated on a surface of the sheet by a vacuum deposition process such as evaporation, sputtering, or the like, a CLD such as sol-gel processing, or the like, a sheet of glass having a surface coating agent containing a metal capable of absorbing radiations in an ultraviolet range, and applied or coated in vacuum on a surface of the sheet, and a sheet of glass having a surface coating agent containing an organic material (ultraviolet absorbent: UVA) capable of absorbing radiations in an ultraviolet range and coated on a surface of the sheet.

Certain automobile window glass sheets comprise sheets of heat-reflecting glass coated with a heat-reflecting film for reducing the level of solar energy that enters the passenger's compartment thereby to lessen the burden on the air-conditioning unit combined with the passenger's compartment. One known sheet of heat-reflecting glass has a heat-reflecting film formed on a surface of the sheet of glass, and an over-coat layer (protective layer) formed on the surface of the heat-reflecting film.

If those sheets of ultraviolet-cutoff glass which have a surface layer capable of cutting off or blocking ultraviolet rays are to remain uncolored and also to be as effective to cut off ultraviolet radiations as sheets of laminated glass, then they need to be coated with a surface coating agent that contains an ultraviolet absorbent (UVA). However, if the content of the UVA in the surface coating agent is increased, then the strength and hence surface hardness of the layer of the surface coating agent are lowered, making the layer of the surface coating agent vulnerable to damage. The UVA suffers a complex deterioration in the presence of water upon exposure to ultraviolet rays. For these reasons, the layer of the surface coating agent is required to be coated with a over-coat layer.

The over-coat layer thus coated as a protective layer on the surface coating layer that contains the UVA or the surface of the heat-reflecting film has its own problems. Specifically, it is necessary for the entire manufacturing process to include an additional process of growing the over-coat layer. Since the over-coat layer is normally grown in an oxygen atmosphere, the rate of growth of the over-coat layer is extremely low, resulting in reduced productivity. The sheets of heat-reflecting glass which are combined with the over-coat layer have a glaring appearance because the heat-reflecting film and the over-coat layer have refractive indexes higher than the refractive index of glass.

SUMMARY OF THE INVENTION

It is therefore an object of the present invention to provide a sheet of ultraviolet-cutoff glass capable of cutting off or blocking ultraviolet rays applied thereto and also of repelling water applied thereto, the sheet of ultraviolet-cutoff glass requiring no over-coating process for its manufacture and being free of a glaring appearance.

Another object of the present invention is to provide a sheet of heat-cutoff glass capable of cutting off or blocking heat radiations applied thereto and also of repelling water applied thereto, the sheet of heat-cutoff glass requiring no over-coating process for its manufacture and being free of a glaring appearance.

According to the present invention, there is provided a sheet of ultraviolet-cutoff glass comprising a glass sheet, an ultraviolet-cutoff layer disposed on the glass sheet, and a water-repellent layer disposed on the ultraviolet-cutoff layer, the water-repellent layer being formed of a vitreous water repellent.

According to the present invention, there is also provided a sheet of heat-cutoff glass comprising a glass sheet, a heat-cutoff layer disposed on the glass sheet, and a water-repellent layer disposed on the heat-cutoff layer, the water-repellent layer being formed of a vitreous water repellent.

The vitreous water repellent may comprise a vitreous matrix and a water repelling material incorporated therein. The vitreous matrix may be composed of a skeleton of silicon oxide made from alkoxysilane, and the water repelling material comprises water repelling molecules of fluoroalkylsilane which are incorporated into the skeleton of silicon oxide.

The sheet of ultraviolet-cutoff glass which includes the ultraviolet-cutoff layer and the water-repellent layer is capable of cutting off or blocking ultraviolet rays applied thereto and also of repelling water applied thereto. The sheet of heat-cutoff glass which includes the heat-cutoff layer and the water-repellent layer is capable of cutting off or blocking heat radiations applied thereto and also of repelling water applied thereto.

Furthermore, since the water-repellent layer doubles as an over-coat layer, it makes it unnecessary to form a over-coat layer in a separate over-coating process.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
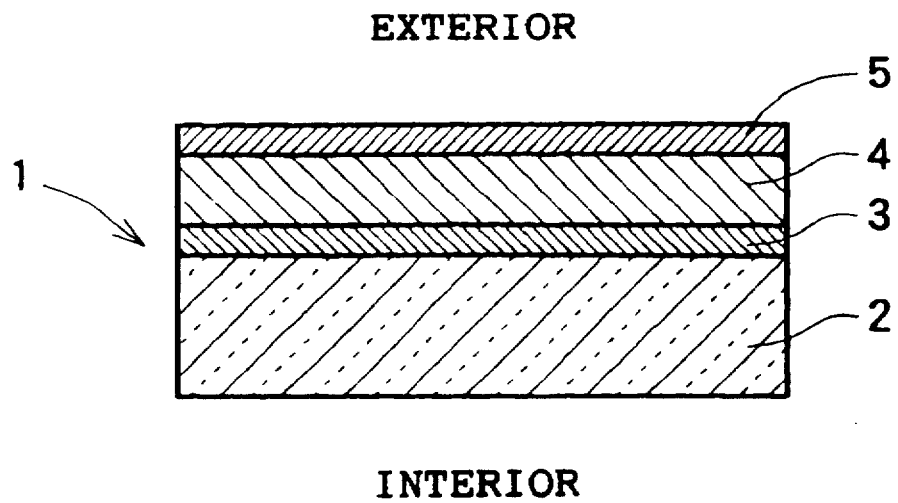
FIG. 1 is a schematic cross-sectional view of a sheet of ultraviolet-cutoff glass according to the present invention.

As shown in FIG. 1, a sheet 1 of ultraviolet-cutoff glass according to the present invention comprises a glass sheet 2, a primer layer 3 deposited on the glass sheet 2, an ultraviolet-cutoff layer 4 deposited on the primer layer 3, and a water-repellent layer 5 deposited on the ultraviolet-cutoff layer 4. The glass sheet 2 may be an automobile window glass sheet, for example. If the glass sheet 2 is an automobile window glass sheet, then the primer layer 3, the ultraviolet-cutoff layer 4, and the water-repellent layer 5 are arranged successively in the order named from the interior side of the sheet 1 toward the exterior side of the sheet 1.

A process of manufacturing the sheet 1 of ultraviolet-cutoff glass will be described below with respect to the successive steps of the process.

Cleaning of glass sheet:

A glass sheet on which various layers will be deposited is cleaned in order to prevent interlayer peeling and coating irregularities. The glass sheet may be cleaned by ultrasonic cleaning, ultraviolet cleaning, cleaning with cerium rouge, cleaning with an acid, cleaning with an alkali, cleaning with a surface active agent including a detergent, cleaning with an organic solvent including Freon, or the like, either alone or in combination. After the glass sheet is cleaned, it is rinsed so that no cleaning agent will remain thereon, and then dried.

Deposition of ultraviolet-cutoff layer:

A primer layer and an ultraviolet-cutoff layer are successively deposited on the surface of the glass sheet as follows:

(1) Treatment with an acid:

The cleaned glass sheet is treated with an acid to activate the surface of the glass sheet. The acid is in the form of a dilute solution containing at least one of nitric acid, sulfuric acid, and hydrochloric acid, which are general acids. The acid should preferably be diluted to a concentration ranging from 10 to 30%. The glass sheet is immersed in the dilute solution for a period of time ranging from 1 to 20 minutes. Thereafter, the glass sheet is rinsed so that no acid will remain thereon, and then dried.

(2) Priming:

The glass sheet which has been treated with an acid is primed to increase the bonding strength between the glass sheet and layers which will be deposited thereon. The primer applied to form a primer layer on the glass sheet may comprise any one of coupling agents of silane, titanate, and isocyanate, which are general coupling agents for use with glass. Particularly preferable is a coupling agent of aminosilane in view of its high bonding strength and long usable life.

(3) Coating of ultraviolet-cutoff layer:

A coating agent containing a UVA is coated on the primer layer deposited on the glass sheet, and then fired into an ultraviolet-cutoff layer. The UVA-containing coating agent is not limited to any coating agent, but may be any one of coating agents including commercially available coating agents. The UVA comprises at least one of benzophenones including 2,4-hydroxy benzophenone and 2,2',4,4'-tetrahydroxy benzophenone, and triazoles including 2-(2'-hydroxy-5-methylphenyl)benzotriazole and 2-(2'-hydroxy-3'-t-butyl-5-methylphenyl)5-chlorobenzotriazole. The coating agent includes a matrix in which the UVA is fixed and which is mainly composed of colloidal silica, methyl trimethoxysilane, glycidoxypropyltrimethoxysilane, and carbolic acid.

The UVA-containing coating agent may be coated on the primer layer by a general coating process such as a dip coating process, a spin coating process, a spray coating process, or a flow coating process. The coated layer of the UVA-containing coating agent may be fired under any conditions insofar as the matrix develops its strength and the UVA is not deteriorated. Specifically, it is preferable to fire the coated layer at a temperature ranging from 150 to 250° C. for a period of time ranging from 5 to 30 minutes.

Deposition of water-repellent layer:

A water repellent is coated on the ultraviolet-cutoff layer, and then fired into a water-repellent layer. The water repellent includes a vitreous matrix composed of a skeleton of silicon oxide made from alkoxysilane, and a water repelling material comprising water repelling molecules of fluoroalkylsilane which can be incorporated into the skeleton of silicon oxide.

The matrix and the water repelling material are dissolved into a solvent, hydrolyzed with water and a catalyst, and then condensed into a water repellent. Specifically, the water repellent is produced as follows:

The following materials:

| (a) | ethyl alcohol (solvent) | 853.20 g |
|---|---|---|
| (b) and | tetraethoxysilane (matrix) | 100.00 g |
| (c) | heptadecafluorohexenyl trimethoxysilane (water repelling material) | 2.73 g | are added and agitated into a uniform mixture. To the mixture, there are added:

| (e) pure water (for hydrolysis) | 42.50 g |
|---|---|
| and | |
| (f) 0.1 N hydrochloric acid (catalyst) | 52.70 g. |

The mixture is hydrolyzed, and then condensed by being left in a sealed container for about one week.

The water repellent may be coated on the ultraviolet-cutoff layer by a general coating process such as a dip coating process, a spin coating process, a spray coating process, or a flow coating process.

If the dip coating process is employed, then the water repellent is used as it is, and its coating thickness is controlled with the pull-up speed so as not to reach an interference film thickness. If the flow coating process or other processes are employed, then the water repellent is diluted by a solvent for concentration control before use. The coated layer of the water repellent may be fired under any conditions insofar as the vitreous matrix develops its strength and the UVA and the water repelling material are not deteriorated. Specifically, it is preferable to fire the coated layer at a temperature ranging from 150 to 250° C. for a period of time ranging from 10 to 60 minutes.

In order to confirm the effects and advantages of the present invention, Inventive Example 1 and Comparative Examples 1~7 having respective layer structures shown in Table 1 given below were prepared as automobile window glass sheets, and checked for their ultraviolet-cutoff capability and water repelling capability in actual automobile running tests. The durability and the number of coating layers required of each of Inventive Example 1 and Comparative Examples 1~7 were also evaluated.

TABLE 1

| | Layer structure<br>Interior ← Glass → Exterior |
|---|---|
| In. Ex. 1 | Glass + Primer layer + UV-cutoff layer + Water-repellent layer |
| Com. Ex. 1 | Glass + Primer layer + UV-cutoff layer + Overcoat layer |
| Com. Ex. 2 | Glass + Primer layer + UV-cutoff layer |
| Com. Ex. 3 | Glass + Uv-cutoff layer |
| Com. Ex. 4 | UV-cutoff layer + Primer layer +Glass |
| Com. Ex. 5 | UV-cutoff layer + Primer layer +Glass + Water-repellent layer |
| Com. Ex. 6 | Overcoat layer + UV-cutoff layer + Primer layer +Glass |
| Com. Ex. 7 | Overcoat layer + UV-cutoff layer + Primer layer +Glass + Water-repellent layer |

The ultraviolet-cutoff capability was confirmed based on the sunburn in the automobile while it was running, and the water repelling capability was confirmed based on the movement of water droplets on the sheets of ultraviolet-cutoff glass. The durability (weather resistance) was measured for deterioration of the layers by a sunshine weather meter after elapse of 500 hours each consumed by the application of ultraviolet rays for 48 minutes and water for 12 minutes. The number of coating layers required was evaluated as the cost of each of the sheets of ultraviolet-cutoff glass. Table 2 given below shows evaluations of the tested sheets of ultraviolet-cutoff glass. With respect to the ultraviolet-cutoff capability in Table 2, the mark "○" indicates almost no sunburn and the mark "x" indicates sunburn that was confirmed. With respect to the water repelling capability in Table 2, the mark "○" indicates that water droplets were moved quickly off the sheets of ultraviolet-cutoff glass while the automobile was running, and the mark "x" indicates that water droplets remained on the sheets of ultraviolet-cutoff glass. With respect to the durability in Table 2, the mark "○" indicates almost no deterioration of the layers and the mark "x" indicates deterioration of the layers that was confirmed. With respect to the number of coating layers required in Table 2, the mark "⊙" indicates 1~2 layers, the mark "○" indicates 3 layers, and the mark "Δ" indicates 4 or more layers.

TABLE 2

| | UV-cutoff capability | Water repelling capability | Durability | Cost |
|---|---|---|---|---|
| In. Ex. 1 | ○ | ○ | ○ | ○ |
| Com. Ex. 1 | ○ | x | ○ | ○ |
| Com. Ex. 2 | ○ | x | x | ⊙ |
| Com. Ex. 3 | x | ○ | ○ | ⊙ |
| Com. Ex. 4 | ○ | x | x | ⊙ |
| Com. Ex. 5 | ○ | ○ | x | ○ |
| Com. Ex. 6 | ○ | x | ○ | ○ |
| Com. Ex. 7 | ○ | ○ | ○ | Δ |

It can be seen from Table 2 that Inventive Example 1 are satisfactory with respect to the ultraviolet-cutoff capability, the water repelling capability, and the durability, and requires a relatively small number of coating layers. Comparative Examples 1, 2, 4, 6 have no water repelling capability, Comparative Example 3 has no ultraviolet-cutoff capability, and Comparative Example 7 requires a larger number of coating layers.

The sheet of ultraviolet-cutoff glass according to the present invention has an ultraviolet-cutoff capability and a water repelling capability, requires no over-coating process because the water-repellent layer which includes a vitreous matrix doubles as an over-coat layer, and hence requires a relatively small number of coating layers, and has its ultraviolet-cutoff layer prevented from being deteriorated because the water-repellent layer serves to block water against penetration into the ultraviolet-cutoff layer.

Figure 2:
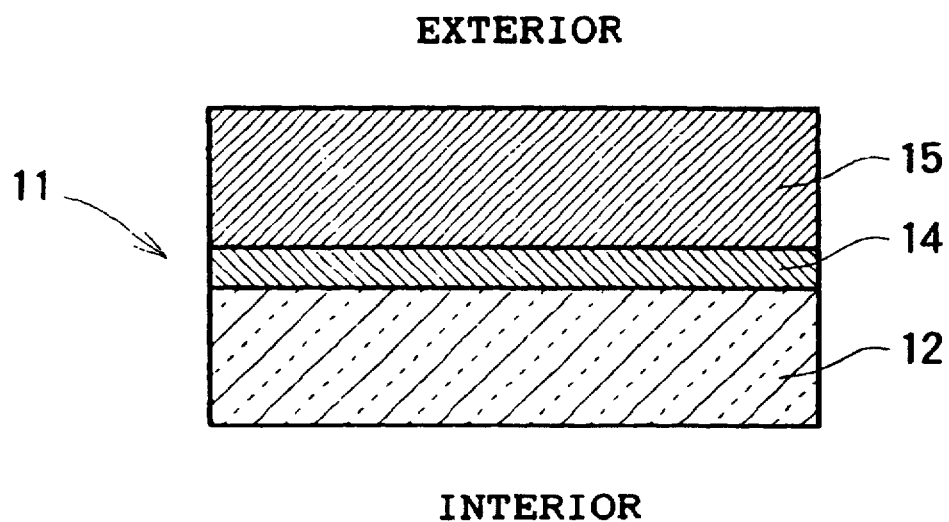
FIG. 2 is a schematic cross-sectional view of a sheet of heat-cutoff glass according to the present invention.

As shown in FIG. 2, a sheet 11 of heat-cutoff glass according to the present invention comprises a glass sheet 12, a heat-cutoff layer 14 deposited on the glass sheet 12, and a water-repellent layer 15 deposited on the heat-cutoff layer 14. The glass sheet 12 may be an automobile window glass sheet, for example. If the glass sheet 12 is an automobile window glass sheet, then the heat-cutoff layer 14 and the water-repellent layer 15 are arranged successively in the order named from the interior side of the sheet 11 toward the exterior side of the sheet 11.

A process of manufacturing the sheet 11 of heat-cutoff glass will be described below with respect to the successive steps of the process.

Cleaning of glass sheet:

A glass sheet on which various layers will be deposited is cleaned in order to prevent dirt deposition, interlayer peeling, and coating irregularities. The glass sheet may be cleaned in the same manner as with the sheet 1 of ultraviolet-cutoff glass.

Deposition of heat-cutoff layer:

A heat-cutoff layer is deposited on the surface of the glass sheet. The heat-cutoff layer is made of titanium, chrominum, or the like, and deposited on the glass sheet by a vacuum process in an atmosphere containing nitrogen, oxygen, and argon. Preferably, a chrominum-base material should be used as the material of the heat-cutoff layer because a titanium-nitride-base material tends to turn into titanium oxide when a water repellent will subsequently be fired.

Deposition of water-repellent layer:

A water repellent is coated on the heat-cutoff layer, and then fired into a water-repellent layer. If the water-repellent layer is formed upon elapse of a substantial period of time after the heat-cutoff layer has been deposited, it is preferable to clean the assembly in the same manner the glass sheet was first cleaned. The water-repellent layer is made of the same matrix and water repelling material, and the water repellent is produced in the same manner, as with the sheet of ultraviolet-cutoff glass. After the water repellent is coated on the heat-cutoff layer, it may be fired under any conditions insofar as the vitreous matrix develops its strength and the water repelling material is not deteriorated. Specifically, it is preferable to fire the coated layer at a temperature ranging from 150 to 400° C., more preferably from 200 to 300° C.

In order to confirm the effects and advantages of the present invention, Inventive Example 2 and Comparative Examples 8~14 having respective layer structures shown in Table 3 given below were prepared as automobile window glass sheets, and checked for their heat reflecting capability and water repelling capability in actual automobile running tests. The appearance, the durability (wear resistance and weather resistance), and the number of coating layers required of each of Inventive Example 2 and Comparative Examples 8~14 were also evaluated. In each of Inventive Example 2 and Comparative Examples 8~14, the glass sheet was a blank sheet of bronze 5.0 t, the heat-cutoff layer was made of CrOxNy (5 nm), and a protective layer (over-coat layer) was made of $SnO_2$ (10 nm)+$Ta_2O_5$ (5 nm).

TABLE 3

| | Layer structure<br>Interior ← Glass → Exterior |
|---|---|
| In. Ex. 2 | Glass + Heat-cutoff layer + Water-repellent layer |
| Com. Ex. 8 | Protective layer + Heat-cutoff layer +Glass |
| Com. Ex. 9 | Heat-cutoff layer +Glass |
| Com. Ex. 10 | Glass + Water-repellent layer |
| Com. Ex. 11 | Protective layer + Heat-cutoff layer +Glass + Water-repellent layer |
| Com. Ex. 12 | Glass + Heat-cutoff layer + Protective layer |
| Com. Ex. 13 | Glass + Heat-cutoff layer |
| Com. Ex. 14 | Glass + Heat-cutoff layer + Protective layer + Water-repellent layer |

The heat reflecting capability was confirmed based on whether an occupant of the automobile sensed a reduction in the hotness ($\Delta Tg \geq$ several %) or not. The water repelling capability was confirmed based on whether water droplets were moved quickly off the sheets of heat-cutoff glass while the automobile was running at a speed of several tens km/h. The appearance was confirmed whether the reflectance of each of coated and uncoated surfaces of the sheets of heat-cutoff glass is similar to that of glass (R≤7%) or not. The wear resistance was confirmed based on whether the coated layers were deteriorated by 1000 abrasive actions by the CS-10F abrasive member, 500 g, of a Taber's abrasion resistance tester, or not. The wear resistance was confirmed measured for deterioration of the layers by a sun-shine weather meter after elapse of 500 hours each consumed by the application of ultraviolet rays for 48 minutes and pure water for 12 minutes. The number of coating layers required was evaluated as the cost of each of the sheets of heat-cutoff glass. Table 4 given below shows evaluations of the tested sheets of heat-cutoff glass. With respect to the heat reflecting capability in Table 4, the mark "○" indicates that the occupant sensed a reduction in the hotness and the mark "x" indicates that the occupant sensed no reduction in the hotness. With respect to the water repelling capability in Table 4, the mark "○" indicates that water droplets were moved quickly off the sheets of heat-cutoff glass while the automobile was running, and the mark "x" indicates that water droplets remained on the sheets of heat-cutoff glass. With respect to the wear resistance in Table 4, the mark "○" indicates almost no deterioration of the layers and the mark "x" indicates deterioration of the layers that was visually confirmed. With respect to the weather resistance in Table 4, the mark "○" indicates almost no deterioration of the layers and the mark "x" indicates deterioration of the layers that was visually confirmed. With respect to the number of coating layers required in Table 4, the mark "⊙" indicates 1 layer, the mark "○" indicates 2 layers, and the mark "Δ" indicates 3 layers.

TABLE 4

| | Additional functions | | | Durability | | |
|---|---|---|---|---|---|---|
| | Heat reflecting capability | Water repelling capability | Appearance | Wear resistance | Weather resistance | Cost |
| In. Ex. 2 | ○ | ○ | ○ | ○ | ○ | ○ |
| Com. Ex. 8 | ○ | x | Δ | x | ○ | ⊙ |
| Com. Ex. 9 | x | x | Δ | ○ | x | ○ |
| Com. Ex. 10 | ○ | ○ | ○ | ○ | ○ | ⊙ |
| Com. Ex. 11 | ○ | ○ | ○ | ○ | ○ | Δ |
| Com. Ex. 12 | ○ | x | Δ | ○ | ○ | ⊙ |
| Com. Ex. 13 | ○ | x | Δ | x | x | ○ |
| Com. Ex. 14 | ○ | ○ | ○ | ○ | ○ | Δ |

Optical characteristics of Inventive Example 2 and Comparative Examples 8~14 are shown in Table 5 below.

TABLE 5

| | Transmittance | Reflectance Ra(a,b) | |
|---|---|---|---|
| | Ya(a,b)Tg | Interior | Exterior |
| In. Ex. 2 | 72.2(0.07,5.77)63.3 | 5.9(0.26,2.18) | 5.2(0.45,2.61) |
| Com. Ex. 8 | 70.9(0.10,4.67)62.2 | 9.7(−0.04,−2.94) | 8.1(0.38,−0.68) |
| Com. Ex. 9 | 71.5(0.19,5.11)63.3 | 7.3(0.27,1.87) | 6.2(0.42,0.94) |
| Com. Ex. 10 | 75.7(0.00,3.69)66.9 | 5.7(0.33,0.92) | 5.4(0.33,1.77) |
| Com. Ex. 11 | 72.2(0.23,4.83)63.6 | 6.9(−1.06,−1.84) | 5.9(0.33,0.83) |
| Com. Ex. 12 | 70.9(0.10,4.67)62.2 | 8.1(0.38,−0.68) | 9.7(−0.04,−2.94) |
| Com. Ex. 13 | 71.5(0.19,5.11)63.3 | 6.2(0.42,0.94) | 7.3(0.27,1.87) |
| Com. Ex. 14 | 72.6(0.13,5.18)63.8 | 6.5(0.24,2.51) | 5.7(0.25,1.90) |

As can be understood from Tables 4 and 5, Inventive Example 2 is satisfactory with respect to the heat reflecting capability, the water repelling capability, the appearance, and the durability, and requires a relatively small number of coating layers. Comparative Examples 8~13 are not satisfactory with respect to all the heat reflecting capability, the water repelling capability, the appearance, and the durability, and Comparative Example 14 is satisfactory with respect to all the heat reflecting capability, the water repelling capability, the appearance, and the durability, but requires a larger number of coating layers.

The sheet of heat-cutoff glass according to the present invention has a heat-cutoff capability and a water repelling capability, requires no over-coating process because the water-repellent layer which includes a vitreous matrix doubles as an over-coat layer, and hence requires a relatively small number of coating layers, and does not have a glaring appearance because the water-repellent layer has a refractive index of about 1.4 which is lower than the refractive index (1.8–2.0) of an over-coat layer which would otherwise be deposited on the heat-cutoff layer.

The principles of the present invention are applicable to a sheet of glass which is covered with an over-coat layer (protective layer) for increased surface hardness and also for the purpose of increasing the wear resistance of a coated base plate.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A sheet of ultraviolet-cutoff glass comprising:

a glass sheet;

an ultraviolet-cutoff layer disposed on said glass sheet;

a water-repellent layer disposed on said ultraviolet-cutoff layer, said water-repellent layer being formed from a hydrolyzed mixture of tetraalkoxysilane and water-repelling molecules of fluoroalkyl alkoxy silane; and a primer layer disposed between said glass sheet and said ultraviolet-cutoff layer, the primer layer formed from a coupling agent which increases bonding strength between the glass sheet and the ultraviolet-cutoff layer.

2. The sheet of ultraviolet-cutoff glass of claim 1, the coupling agent selected from the group consisting of silane, titanate, and isocyanate.

3. A sheet of heat-cutoff glass comprising:

a glass sheet;

a heat-cutoff layer disposed on said glass sheet; and a water-repellent layer disposed on said heat-cutoff layer, said water-repellent layer being formed from a hydrolyzed mixture of tetraalkoxysilane and water-repelling molecules of fluoroalkyl alkoxy silane, and wherein the water-repellent layer has a refractive index of about 1.4.

* * * * *